United States Patent [19]

Isadore-Barreca

[11] Patent Number: 5,590,262
[45] Date of Patent: Dec. 31, 1996

[54] INTERACTIVE VIDEO INTERFACE AND METHOD OF CREATION THEREOF

[75] Inventor: Anthony J. Isadore-Barreca, Oakland, Calif.

[73] Assignee: Magic Circle Media, Inc., San Jose, Calif.

[21] Appl. No.: 146,964

[22] Filed: Nov. 2, 1993

[51] Int. Cl.$^6$ ............................................. G06T 1/00
[52] U.S. Cl. ........................... 395/806; 395/326; 395/601
[58] Field of Search .................................... 395/154, 152, 395/155, 159, 157, 600, 161; 348/222, 232, 563–567, 588; 345/122; 369/32

[56] References Cited

U.S. PATENT DOCUMENTS

| | | | |
|---|---|---|---|
| 5,237,648 | 8/1993 | Mills et al. | 395/133 |
| 5,301,172 | 4/1994 | Richards et al. | 369/32 |
| 5,377,319 | 12/1994 | Kitahara et al. | 395/161 |

OTHER PUBLICATIONS

Tomomura et al, "Content Oriented Visual Interface Using Video Icons . . . ", 1989 IEEE, pp. 68–73.

*Primary Examiner*—Joseph H. Feild
*Attorney, Agent, or Firm*—Oblon, Spivak, McClelland, Maier & Neustadt P.C.

[57] ABSTRACT

An interactive video creation method (34) for constructing an interactive video interface (34) having a primary video layer (12a), a library layer (12b) and a resource data base layer (12c). The primary video layer (12a) is a conventional video presentation where a plurality of sequences (16) are identified and one or more key frames (18) designated within each of the sequences (16). An establish edit decision list operation (36a) is applied to identify the sequences (16), and an establish key frame data base operation (36b) is applied to identify the key flames (18). A designate hot spots operation (36c) is then applied to make available the user an information in the resource data base layer (12c) which is keyed to hot spots (52) in that key frame (18) through the library layer (12b).

10 Claims, 5 Drawing Sheets

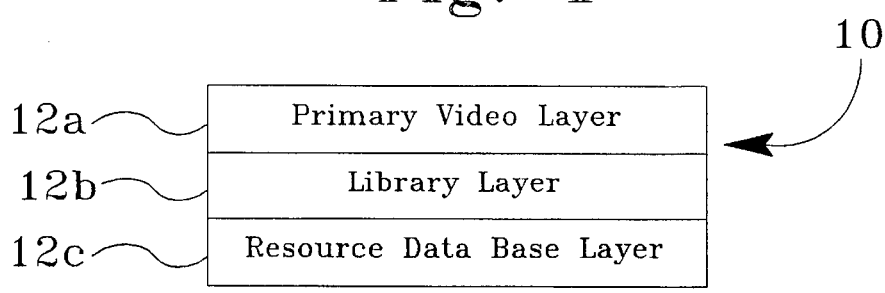
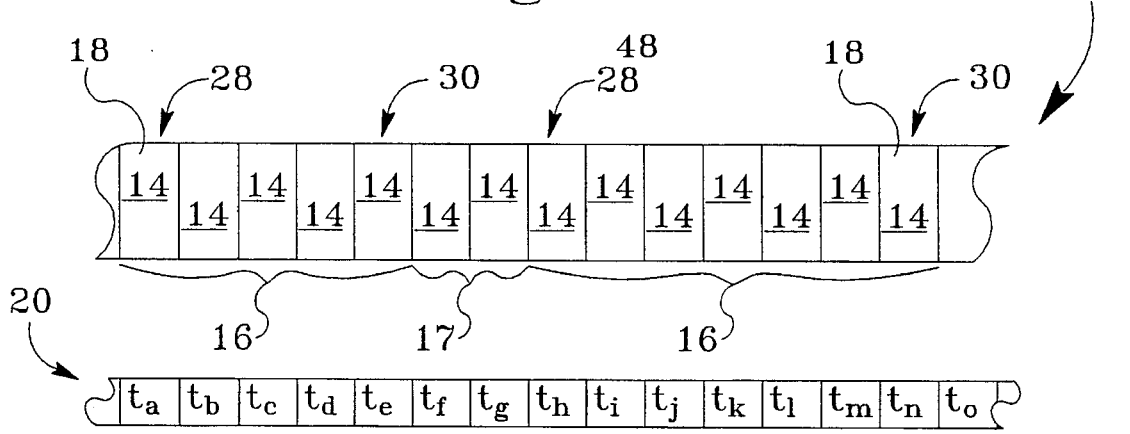

Fig. 3

| | |
|---|---|
| 24a | $20(t_a)$ |
| 24b | $20(t_b)$ |
| 24c | $20(t_c)$ |
| 24d | $20(t_d)$ |
| 24e | $20(t_e)$ |
| 24f | $20(t_f)$ |
| 24g | $20(t_g)$ |
| 24h | $20(t_h)$ |
| 24i | $20(t_i)$ |
| 24j | $20(t_j)$ |
| 24k | $20(t_k)$ |

Fig. 4

| Transform Information | |
|---|---|
| IN | $20(t_a)$ |
| OUT | $20(t_e)$ |
| Transform Information | |
| IN | $20(t_h)$ |
| OUT | $20(t_n)$ |
| Transform Information | |

Fig. 7

| | | | | | |
|---|---|---|---|---|---|
| 28a | 30a | TYPE 0 40a | 46 | 56a | 62a |
| 28b | 30b | TYPE 1 40b | 10 | 56b | 58a | 62b |
| 28c | 30c | TYPE 2 40c | 5 | 56c | 58b | 62c |
| 28d | 30d | TYPE 3 40d | 0 | 56d | 58c | 62d |
| 28e | 30e | TYPE 2 40c | 1 | 56e | 58c | 62e |

INTERACTIVE VIDEO INTERFACE AND METHOD OF CREATION THEREOF

TECHNICAL FIELD

The present invention relates generally to the field of computer user interfaces, and more particularly to a unique method for modifying a conventional video composition to function as a data interface. The predominant current usage of the inventive interactive video interface and creation method is in the production of interactive multimedia works to be used as sales presentation means, educational or training devices, or the like.

BACKGROUND ART

As computers have become increasingly powerful and sophisticated, it has been recognized that a primary limitation on the usefulness of computers lies in the ability or willingness of consumers to use them. It is of little value that a computer has the capability of rapidly accessing vast libraries of information if those for whom the information is intended find the process to be too difficult or tedious. Significant advances have been made in recent years in making computers more "user friendly". Predominant among these advances has been the introduction of graphical user interfaces ("GUI") which can make using computers to access information both easier and more interesting.

A somewhat related development in the field has resulted in what are sometimes referred to as "interactive" interfaces. While there is no universally accepted definition of an interactive interface, it is generally understood to be one in which the user initiates computer action by reacting to screen displays (as by "pointing and clicking" on a part of the screen display using a mouse to control the position of a cursor), whereupon the computer changes the screen display in response to the user's action and the user may respond to the revised display, and so on. This results in an "interactive" flow of communication back and forth between the user and the computer.

Interactive interfaces are used, for example, in video games, wherein the user may "click on" objects of interest in a video frame to acquire information about the object or to take some action in respect to that object. For the most part, view screens for these applications are of a "semianimated" nature wherein one or two objects are caused to move in relation to the background and/or to each other such that the computer can readily keep track of the relative locations of relevant objects and of the location of a cursor controlled by the mouse or other user input means. A somewhat similar user interface is sometimes applied to informational type applications wherein the user can click on objects in a display to get information about that object or to proceed to another video display relevant to that object. The video displays used in this type of interface are usually drawings or digitized still photographs. Examples of applications wherein such interactive user interfaces are used for such purposes can be found, for example, in a number of commercially available Compact Disk Interactive ("CDI") presentations.

In the above described user interfaces, the screen displays are generally specifically created to enable the action which the software engineers who designed the program had in mind. For example, each item in a sales display could be an active object such that clicking on that item produces information about it. In such an application, the display would generally be created after it has been decided which items should be active objects and which, therefore, should be included in the display. Such interfaces are, in many aspects, not really significantly different from the more common graphical user interfaces, except that an item defined by a designated portion of a visual scene is used as an object instead of a more conventional icon. For all practical purposes, the visual depiction of the item is an icon, and the software communicating the user's actions to the computer and responding to such actions is essentially like that of any other graphical user interface.

It should be noted that the interactive user interfaces discussed above, while being quite useful for their intended purposes, have several substantial limitations when applied to multimedia presentations. Most significant are the restrictions placed on the visual displays by the practical limitations of their method of creation. While multimedia is an emerging field the boundaries of which, in many respects, have not yet been fully defined, it is generally agreed that a multimedia presentation will employ the power of computers to provide visually and aurally perceptible stimuli to the intended audience. An objective, then, is to create video and audio that is as interesting and attractive as possible. While designers of multimedia presentations are continually striving, often with notable success, to improve the available technology and methods of production, their efforts are encumbered by an inability to sufficiently divorce the creation of the audio/video displays from the programming process.

Particularly where an interactive multimedia presentation is intended for an audience that is not particularly motivated to take part in the interaction, as might be the case in a sales presentation or the like, it is very important that the video and audio stimuli within the presentation act to capture the attention and interest of the user. However, in today's market place, where consumers are constantly assaulted with a barrage of such stimuli, it is becoming increasingly difficult to make one's presentation stand out from the crowd. As anyone who has seen the best of the motion picture special effects can attest, there are some truly spectacular audio/video stimuli available using today's special effects technology. Clearly, it would be desirable to bring such variety and dimension to interactive multimedia presentations. However, there is a definite discernible gap between the quality of presentation found in today's interactive multimedia presentations as compared to that of today's motion pictures. Even where there is an insignificant amount of interactivity required in an application, users of multimedia presentations will recognize that they are frequently disjointed and stilted as compared to a good motion picture or television show. Furthermore the content of the video, and often even more noticeably the content of the audio, while quite good as compared to the early attempts at multimedia, are still far below that found in today's high quality motion pictures. As the desired degree of interactivity is increased, even the best presently available technology will result in a product which tends to be increasingly lacking in flow and interest holding capacity.

Clearly, it would be desirable to be able to bring to bear in the creation of interactive multimedia all of the powerful tools and techniques to which modern motion pictures owe much of their attraction. However, the distinctions discussed above give evidence to the fact that this has not been possible in the prior art. Prior to the present invention, one charged with the task of creating an audio/video presentation has been hindered by the need to rigidly conform the audio/video aspects of the user interface to a predetermined series of program events. Certainly, a talented film maker encumbered by only a very few very general restrictions as to content, could create an audio/video work that would far surpass anything available today in the interactive multimedia field. However, prior to the present invention, it has been considered to be, if not impossible, at least terribly impractical to attempt to work "backward" beginning with a conventionally produced video work to create an interactive computer user interface. Among the numerous problems which have made this approach seemingly untenable is the fact that a conventional video work has no inherent reference points in time to which a computer might reference the availability of a particular action alternative.

Although a video work may have a Society of Motion Picture and Television Engineers ("SMPTE") time code associated therewith to individually identify each frame of the video this, in and of itself, is of very little use to the interactive multimedia practitioner since it would be completely impractical to try to individually treat each and every frame in the video as a separate user interface. Furthermore, the SMPTE time code provides no reference to the aspects of the video that are important to the interactive multimedia practitioner - such as the points at which there is a significant perceptible change in the visual information presented to the user. Prior to the present invention, any attempts to limit the number of video frames which are treated as user interface displays, as compared to the number of frames in a comparable conventional video presentation, have only resulted either in unnaturally interrupting the flow of the video or causing any of a number of other perceptual or cognitive lapses, most of which are sufficiently onerous as to render the method unusable.

A tangentially related concept that should be considered as prior art in relation to the present inventive method is that of a "key frame" which concept is used in the field of animation. A key frame is simply a frame of the animation that marks a transition between scenes in the animated work. The key frames are first identified in a "story board" as the animation is planned, and the animation is later completed to fill in the gaps between the key frames.

As previously mentioned, clearly it would be advantageous to allow the producers of interactive multimedia works the same degrees of freedom that are afforded the makers of conventional audio/video works. Moreover, it anticipated that it would also be useful, in many applications and instances, to convert a preexisting audio/video work, which was made with absolutely no consideration that it might later be used for the purpose, for use as an interactive computer user interface.

To the inventors' knowledge, no prior art method or means has provided a way to efficiently convert a conventional audio/video work into a practical computer user interface. All prior art methods for creating interactive computer user interfaces using digitized video and audio have either entailed creating the video and audio specifically for, and to the specifications of, the program for which they are intended, or else they have employed still pictures and/or disjointed film clips to illustrate individual aspects of an interactive multimedia presentation.

DISCLOSURE OF INVENTION

Accordingly, it is an object of the present invention to provide a method for efficiently converting a conventional audio/video presentation into a computer user interactive interface.

It is another object of the present invention to provide an interactive video creation method which can convert either a preexisting video, and/or a video made especially for the purpose, into a computer user interactive interface.

It is still another object of the present invention to provide an interactive video creation method which will provide an intuitively understandable sequence of commands and events.

It is yet another object of the present invention to provide an interactive video creation method which minimizes the use of computer resources without sacrificing the presentation quality of the multimedia display.

It is still another object of the present invention to provide an interactive video creation method which can create interactive multimedia interfaces incorporating many of the desirable qualities of today's technologically advanced motion pictures.

It is yet another object of the present invention to provide a multimedia computer user interface which is interesting and attractive to a user.

It is still another object of the present invention to provide a multimedia computer user interface which is easily understood and used even by persons untrained in the use of computers.

Briefly, the preferred embodiment of the present invention is an interactive video computer interface produced according to a method wherein a plurality of key frames are defined in a conventional live action audio/video work and a record is made of the key frames therein, the record including the corresponding SMPTE code of each key frame. Selection of the key frames is made according to a set of criteria which can be universally applied to essentially any video work and which will prevent undesirable cognitive or perceptual discontinuities between any frame of the presentation which a user might select as being of interest and an associated key frame. Items, areas or other identifiable characteristics within the key frames about which the creator of the work wishes to provide information and/or which the creator wishes to use to branch to other presentations or user selectable alternatives are defined as objects and marked with an identification overlay. Programming is provided to allow the user to interact with the presentation by stopping the video at any frame and selecting an object with an input device, such as a mouse.

An advantage of the present invention is that interactive computer user interfaces can be made more interesting and attractive.

A further advantage of the present invention is that live action computer user interfaces can be made easily and inexpensively.

Yet another advantage of the present invention is that an existing work, not originally intended as a computer interface, may be used as an interactive interface.

Still another advantage of the present invention is that the creative liberty of the maker of the audio and/or video presentations is not overly restricted by the requirements of the computer program for which the presentation is to serve as an interface display.

Yet another advantage of the present invention is that computer resources are preserved.

Still another advantage of the present invention is that the user is provided with a smooth flowing, cognitively continuous, interface.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWING

FIG. 1 is diagrammatic representation of an interactive video interface according to the present invention;

FIG. 2 is a diagrammatic representation of the primary video layer of FIG. 1;

FIG. 3 is diagrammatic representation of a key frame data base according to the present invention;

FIG. 4 is a diagrammatic representation of an edit decision list, as used in conjunction with the present inventive method;

FIG. 7 is a diagrammatic representation of the library layer of FIG. 1;

BEST MODE FOR CARRYING OUT INVENTION

Figure 5:
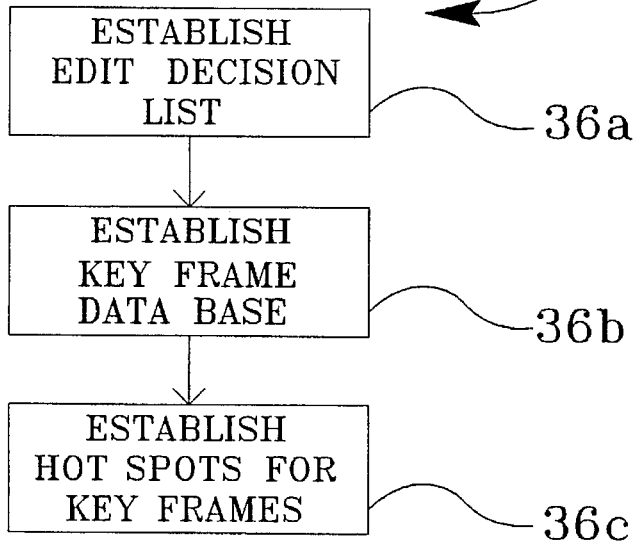
FIG. 5 is a high level flow chart depicting the present inventive method.

The best presently known mode for carrying out the invention is an interactive video interface and associated creation method therefor, for providing access to information stored in a computer through a live action audio/video presentation. The predominant expected usage of the inventive interactive video interface and creation method is in the computer multimedia industry, particularly in the creation of presentations wherein it is particularly desirable that the audio and video stimuli be as interesting and attractive as possible.

An interactive video interface according to the present invention is depicted in a diagrammatic representation in FIG. 1 and is designated therein by the general reference character 10. The interactive video interface 10 has three layers 12 of interactive data. These are a primary video layer 12a, a library layer 12b and a resource data base layer 12c. Discussion of the content and interrelationship of these layers 12 will be found throughout much of the remainder of this disclosure.

The primary video layer 12a is, in fact, a digitized video work (the term "video" will hereinafter include "audio/ video") which has been conventionally digitized so that it can be stored and displayed by a computer. Although one skilled in the art will recognize that there are substantial differences in format between a motion picture film, a television signal and a digitized video, much of the terminology used relating to these different media is transferable among the three. Therefore, although the primary video layer 12a is, in fact, a digitized video, it is convenient to illustrate it in the diagrammatic representation of FIG. 2 as a series of frames 14, just as though the frames 14 were those of a motion picture film. Those skilled in the relevant art will readily understand the relationship between the actual (digitized video) frames 14 and the diagrammatic examples of FIG. 2, since this method of reference is frequently used in the art and the meaning a "frame" of video is commonly used and understood. According to the present invention, an indefinite quantity of the frames 14 is defined as a sequence 16. The primary video layer has a plurality of sequences 16. Successive sequences may or may not have a transition 17 between them, as will be discussed in more detail hereinafter. (It should be noted that, in the film industry, all successive sequences are considered to have a "transition" therebetween as even a "cut" is considered to be a "transition" even if it has a quantity of zero frames 14. Herein, the transitions 17 are defined as being only those "transitions" which occupy one or more frames 14. Accordingly, in the best presently known embodiment 34 of the present inventive method, all of the frames 14 fall within one or another of the sequences 16 or else within the transitions 17 between the sequences The method of selection of the frames 14 to define the sequences 16 will be discussed hereinafter. Having established the sequences, one or more of the frames 14 within each of the sequences 16 is defined as a key frame 18. Each of the frames 14 has associated therewith a distinct frame identifier code 20. The frame identifier code 20 may be the SMPTE code of the original video work or a more abbreviated code, so long as each of the frames 14 of the primary video layer 12a has a corresponding unique frame identifier code 20. In the best presently known embodiment 10 of the present invention, the SMPTE time code is used as the frame identifier code 20.

A key frame data base 22 is illustrated in the diagrammatic representation of FIG. 3. The key frame data base 22 has a plurality of key frame numbers 24 each associated with a corresponding one of the frame identifier codes 20. There is a one to one relationship between the key frame numbers 24 and the actual key frames 18 of FIG. 2 such that, for example, a first key frame number 24a distinctly identifies a first key frame 18a.

Now turning to a discussion of the differentiation of the sequences 16 and the key frames 18 therein, referring to FIG. 4 wherein is diagrammatically depicted an edit decision list ("EDL") 26, the EDL 26 can (and usually will) provide a creator of the inventive interactive video interface 10 with initial reference information. In today's video production environment, a final EDL 26 is produced, in virtually all instances, during the final editing process in the creation of a video work, and is stored as a computer file. The format of the EDL 26 thus created will vary according to the platform (type of computer) used and the video editing application program employed in making the video. However, one skilled in the art can readily create a subroutine to extract the relevant information from the EDL 26 and transform it for use in and with the present invention. The EDL 26 lists an alternating series of "in points" 28 and "out points" 30. Associated with each of the in points 28 and each of the out points 30 is a specific frame identifier code 20. (As previously discussed, in the best presently known embodiment 10 of the present invention, the frame identifier code 20 is simply the SMPTE time code.) Note that some of the in points 28 and some of the out points 30 are also notated, in FIG. 2, in reference to the primary video layer 12a. As can be seen in the view of FIG. 2, the in points 28 and the out points 30 define the boundaries of the sequences 16. For each transition 17, the EDL 26 will usually, but not always, contain information, such as type (wipe, fade, or the like) about each such transition 17 in a transform information data portion 32.

It should be noted that, in order to more clearly depict the several relevant portions of the primary video layer 12a, the edit decision list 26 and other aspects of the best presently known embodiment 10 of the present invention, the quantitative relationships of many of these aspects are intentionally depicted herein in unlikely proportion. For example, a transition 17 (FIG. 2), if present at all, will almost certainly actually be longer than the two frames 14 depicted in the example of FIG. 2. Similarly, a sequence 16 will almost always, in actual practice, be greater in length than the five or seven frames 14 depicted in the examples of FIG. 2.

FIG. 5 is a high level flow chart depicting the present inventive interactive video creation method 34 and the principal high level operations 36 thereof. An establish EDL operation 36a is the first operation 36 of the interactive video creation method 34. An establish key frame data base operation 36b and an establish hot spots operation 36c will be discussed in more detail hereinafter. As discussed above the establish EDL operation 36a may, and usually will, be accomplished by simply transforming a preexisting final EDL 26 into a data format compatible with the particular application of the present invention. However, when no EDL 26 is available (as for example when an old television show is used as the primary video layer 12a) a rough equivalent of an EDL 26 which is sufficient for the present purposes can be made by simply quickly scanning the video and notating the in points 28 and the out points 30 of the sequences 16 (the term "scenes" might be more appropriate than "sequences" when referring to this sort of post production EDL creation). It is anticipated by the inventors that a simple program subroutine will eventually be created that will allow an operator simply to press a key to record the location of the in points 28 and the out points 30 as the raw video production is scanned. In any event, the establish EDL operation 36 can be accomplished by either of the alternative methods discussed.

Figure 6:
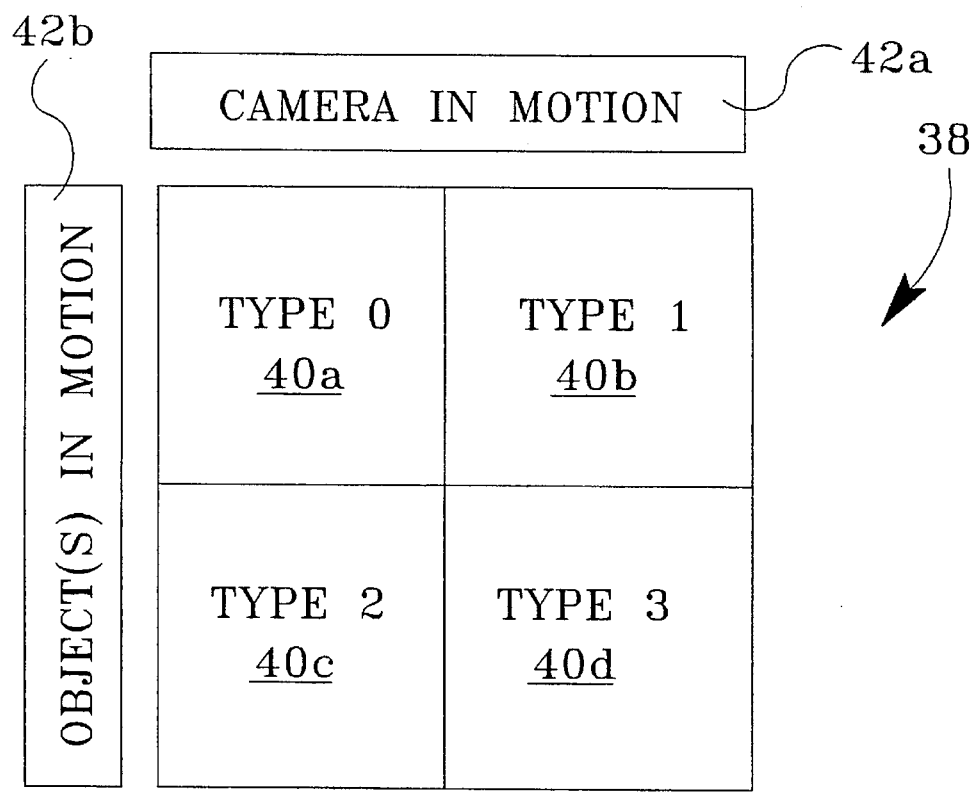
FIG. 6 is sequence type matrix chart.

An establish key frame data base operation 38 follows the establish EDL operation 36 according to the inventive interactive video creation method 34. As previously noted, each sequence 16 (FIG. 1) will have at least one key frame 18 associated therewith. Several factors are incorporated into the inventive method for identifying the key frames 18. Primary among these considerations is the fact that the inventors have concluded that it is highly undesirable for a user to attempt to stop the primary video layer 12a while looking at one frame thereof only to have the display change, in response to that action, to a significantly perceptually different scene. This would be, at the best, disconcerting to the user and, at the worst, a serious detriment to the functionality of the interactive video interface 10. For example, if the user attempted to stop the primary video layer 12a to examine a particular item in the display, and the display were then to jump to a perceptually different frame 20, the item of interest might well, at least in some instances, no longer be in view. In consideration of this concern, the inventors have produced a sequence type matrix chart 38 as depicted in FIG. 6. The sequence type matrix chart 38 is used to assign each sequence a descriptive sequence type 40 according to two sequence typing criteria 42. The sequence typing criteria are: "camera in motion" 42a and "objects in motion" 42b. The sequence types 40 are: "Type 0" 40a, "Type 1" 40a, "Type 2" 40c and "Type 3" 40d. The Type 0 sequences 40a are those in which neither the camera nor significant objects in the field of view are in motion as the sequence 16 is created (a "still" shot). Type 1 sequences 40b are those in which the camera is in motion but objects in view are not in motion (or at least not significantly so). Type 2 sequences 40c are those sequences 16 in which the camera is still but at least some significant objects in the sequence 16 are in motion. Type 3 sequences 40d are those in which both the camera and objects in the sequences 16 are in motion. Although Type 1 40b and Type 2 40c both result in relative motion between the camera and objects within the camera's field of view, they are treated differently for purposes of the present inventive method, as will be discussed in more detail hereinafter.

FIG. 7 is a more detailed diagrammatic representation of the library layer 12b of FIG. 1. As can be seen in the diagram of FIG. 7, the library layer 12b has a sequence schedule 44 and a hot spot table 45. The sequence schedule 44 has, for each sequence 16 (FIG. 2) the in point 28, the out point 30, and a Type designation 40. also included in the sequence schedule 44 is a subtype field 46. According to the present inventive method 34, the subtype field 46 is determined as a function of the relative speed of motion of relevant objects within the associated sequence 16. Each subtype field 46 associated with a Type 1 40b or Type 2 40c sequence 16 will be assigned a value from 1 through 10 wherein a greater number indicates lesser relative speed. For Type 0 sequences 40a the subtype field 46 will remain empty since, as previously discussed, there is no significant relative movement in a Type 0 sequence 40a.

It should be noted that, in the Type 3 sequences 40d, if the camera is tracking one or more moving objects in the sequence 16, then such objects may be relatively static in the sequence 16 even as other objects may be moving through the shot. In such instances, the subtype field 46 will be set to 0. Other iterations of Type 3 sequences 40d will be assigned a value of 1 through 10 as previously discussed in relation to the Type 1 40b and Type 2 40c sequences 16.

Returning again to a consideration of FIG. 3 wherein is shown the key frames data base 22, the establish key frame data base operation 38 (FIG. 5) according to the best presently known embodiment 34 of the present inventive method, is established by applying the following rules: If the sequence 16 is of Type 0 40a or Type 3 40d with a subtype field 46 value of 0, and that sequence 16 is one second or less in duration (30 frames or less), then the sequence 16 has exactly one key frame be and that key frame be will be the first frame 14 in the sequence 16 (not a frame 14 within one of the transitions 17). If the sequence 16 is of Type 0 40a or Type 3 40d with a subtype field 46 value of 0, and that sequence 16 is more than one second in duration, then the sequence 16 has three key frame 18 and those key frames 18 will be the first and last frames 14 in the sequence 16 and the frame 14 midway between the first and last 14 frames in the sequence 16. If the sequence 16 is of Type 1 40a, Type 2 40h or Type 3 40d (other than Type 3 40d with a subtype field 46 value of 0),then the number of key frames 18 within that sequence 16 is determined by the following relationship: The quantity of key frames be in a sequence 16 is calculated to be the total number of frames 14 in that sequence 16 divided by the value of the associated subtype field 46. Put another way, in a sequence having a subtype field 46 of value 1 (very fast motion), then every frame 14 in the sequence 16 is a key frame 18. Where the subtype value is 5, the first frame 14 of the sequence 16 and every fifth frame 14 thereafter will be a key frame 18.

A query interrupt frame 48 is defined as a frame at which the user interacts with the interactive video interface 10. In FIG. 2 a frame 14 has been randomly designated as a query interrupt frame 48. In fact, any frame 14 of the primary video layer 12a might be a query interrupt frame 48. As will be discussed in more detail hereinafter, the key frames 18 interface to the library layer 12b (FIG. 1) of the present inventive interactive video interface 10. Selection of which of the key frames 14 is to be utilized in each instance of the selection of a query interrupt frame 48 is determined, in the best presently known embodiment 10 of the present invention, according to the following criteria: If the query interrupt frame 48 is a key frame 18, then that same key frame 18 is to be employed for the purpose. If the query interrupt frame 48 is not a key frame 18 then the key frame 18 to be designated is that key frame 18 in the same sequence as the query interrupt frame 18 and immediately preceding the query interrupt frame 18. If the query interrupt frame 48 is within a transition 17, then the relevant key frame 18 is the last key frame 18 in the preceding sequence 16.

Figure 8:
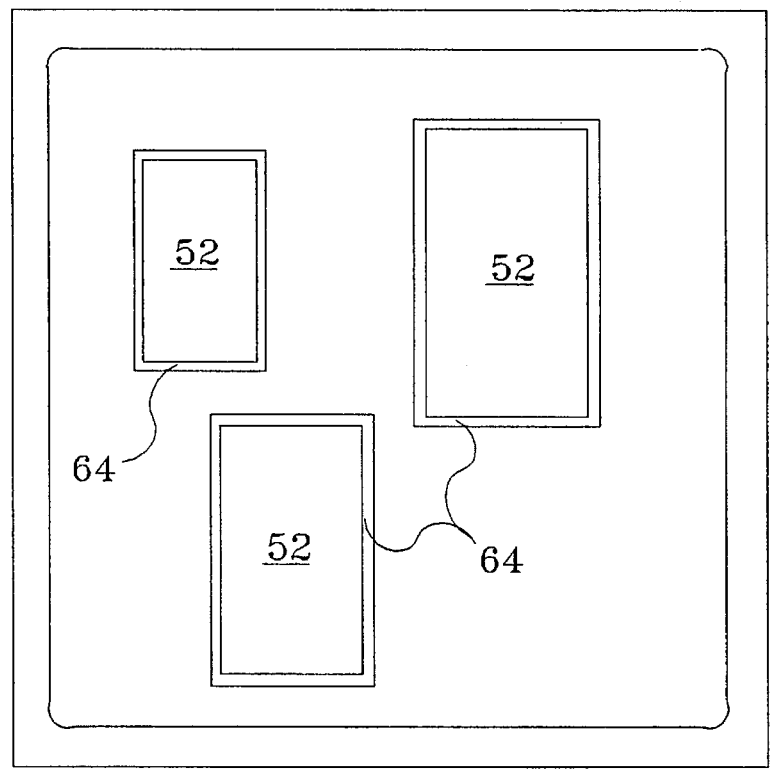
FIG. 8 is a computer monitor screen upon which is displayed a key frame according to the present invention.

Turning now to a discussion of the establish hot spots operation 36c, FIG. 8 is a diagrammatic representation of a computer monitor screen 50 upon which is displayed a rudimentary diagrammatic representation of a typical key frame 18. Within the key frame 18 are several hot spots The hot spots 52 designate areas of the monitor screen 50 which, if selected ("clicked on") by the user, will cause further information from the resource data base layer (FIG. 1) to be provided to the user. Referring now again to the diagram of the library layer 2b depicted in FIG. 7, each of the hot spots 52 has a corresponding identifying hot spot number 56 listed in the hot spot table 45. There is a one to one relationship between the hot spots 52 and the hot spot numbers 56 such that each hot spot number 56 distinctly identifies its corresponding hot spot 52. It should be noted that essentially any numbering system might be used to designate the hot spots 52. For example the hot spot numbers 56 might be assigned sequentially as the hot spots 52 are designated or, alternatively, the hot spot numbers 56 could be a compound number designating the specific key frame and the specific hot spot 52 therein. In the best presently known embodiment 10 of the present invention, the hot spot numbers 56 are assigned to the hot spots 52 sequentially. Corresponding to each hot spot number 56 in the hot spot table 45 is a resource data base pointer 58. As can be seen in the diagram of FIG. 9, a single resource data base pointer (58a for example) may correspond to more than one of the hot spot numbers 56.

Figure 9:
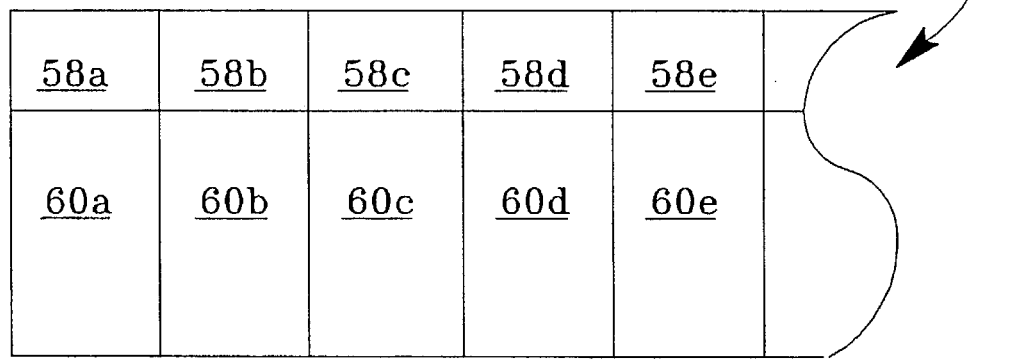
FIG. 9 is diagrammatic representation of the resource data base layer of FIG. 1.

FIG. 9 is a more detailed diagrammatic representation of the resource data base layer 12c of FIG. 1. The resource data base layer has an indefinite quantity of resource items 60, with each resource item 60 being distinctly identified by its resource data base pointer 58. The resource data base pointer 58 may be a memory address wherein the data comprising the resource item 60 begins. Alternatively, the resource data base pointer 5e can simply be a number which is assigned to uniquely identify each resource item 60. In the best presently known embodiment 10 of the present invention, the resource data base pointer 58 is such a specially assigned number. Each resource item 60 in the resource data base layer 12c may be, for example, a sound clip 60a, a video clip 60h, a textual screen display 60c, a still graphic screen display 60d, or any combination of these or other potential computer generated stimuli.

As can be appreciated, then, in light of the above discussion, the establish hot spots operation 36c (FIG. 5) is the assignment of the hot spots 52 to each of the key frames 18. This is accomplished by viewing each key frame 18 and, at least until a more automated system is developed therefor, manually designating which, if any, objects or items of interest in the key frame are to be designated as the hot spots 52. In some cases, this may be a very simple task, in other cases it may be much more difficult. A simple example might be where the inventive interactive video interface 10 is to be used as a sales promotional device, each item which is for sale could be a hot spot 52. As can be seen in the view of FIG. 8, in the best presently known embodiment 10 of the present invention, the hot spots 52 are rectangular in shape, although it is anticipated than hot spots of other shapes, including individually shaped hot spots conforming to the outline of objects of interest, will be used in the future.

Every key frame 18 has at least one hot spot 52 such that the user will never be greeted with a complete absence of options upon stopping the presentation through a query interrupt frame 48. If there are no objects or items of particular interest within a key frame 18, the entire key frame 18 will be designated as a hot spot 52. In the worst (hopefully infrequent) case, if there is nothing of interest to be found about the entire key frame 18 a simple general information type resource item 60 such as a screen message saying "NO INFORMATION AVAILABLE FOR THIS SCREEN—PRESS MOUSE BUTTON TO CONTINUE" might be presented to the user. As stated, it would be an objective to avoid this alternative whenever possible.

To continue the discussion of the establish hot spots operation 36c, it can be appreciated that, although the inventive interactive video creation method 34 is intended to be as automated and/or automatable as possible, at least until the surrounding technology is further advanced, much of the actual selection of the hot spots 52 will have to be accomplished by a human operator, since a knowledge of what is "interesting" and a creative sense of how such things might be tied to available resource items 60 is an important part of this process. It is anticipated, however, that simple software to aid in this process will be written. For example, the computer could be caused to sequentially display each key frame 18 and to give the operator an opportunity to select the hot spots 52 as by clicking on first the upper left corner and then the lower right corner of the rectangular hot spot 52 area. The hot spot number 56 can then be automatically assigned by the computer. The operator has then only to designate which of the resource items 60 is to be associated with that hot spot 52. Selection of such resource items 60 can be accomplished generally simultaneously with the selection of the hot spots 60 or can accomplished at some later time.

Returning again to the hot spot table 45 depicted in FIG. 7, when the operator selects the coordinates of the hot spots 52 as discussed above, such coordinates are stored in the hot spot table 45 as hot spot coordinate data 62. When a user stops the presentation by clicking on a mouse button at a query interrupt frame 48, the view on the monitor screen 50 will change to that of the appropriate key frame 18 although, as previously discussed herein, this should not actually amount to a great perceptual "change" in the display on the monitor screen 50. Thereafter, the computer will use the hot spot coordinates data 62 from the hot spot table 45 to outline the visible hot spots 52 with a hot spot frame 64 such that the user will know which areas of the display are, in fact, hot spots. If, as discussed, the entire key frame 18 is the hot spot 52 in a particular instance, the then entire key frame 18 will be surrounded by the hot spot frame 64. Upon selecting a hot spot 52 the user will be presented with the resource item 60 associated with that hot spot 52 (through its hot spot number 56 in the hot spot table 45). Thereafter, the interactive video interface 10 will continue from the query interrupt frame 48 wherein it was interrupted.

As is shown above, the inventive interactive video interface 10 created according to the interactive video creation method 34 as described herein is similar in some respects to prior art interactive interfaces. Among the substantial differences are the use of a live action video sequences as the primary user interface rather than simply as a display resulting from user interaction with the primary interface. The interactive video creation method 34 makes practical the formerly monumental task of capturing video presentations, including all of their inherent variety and interest holding capabilities, for use as a primary computer user interface. Furthermore, the necessity to tailor video sequences to the narrow requirements of a conventional interface matrix is eliminated.

Various modifications may be made to the invention without altering its value or scope. For example, alternatives other than just selecting a hot spot 52, such as providing a pull down menu for reversing the direction of flow of the interactive video interface in case the user "overshoots" the desired key frame 18, or similar such accessories, might be presented to the user when the interactive video interface 10 is stopped at a key frame 18. Another conceivable change would be to provide a user with a choice of resource items 60 upon his or her selection of a hot spot 52. For example, the user might be given a choice between a brief textual definition of an item of interest or a longer audio/video presentation about such item.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The interactive video creation method 34 is intended to be widely used in the creation of computer user interfaces for a wide variety of computer applications. The predominant intended usages are for the presentation of information via computer to audiences that may not be self motivated to seek out such information. Since a video presentation can be created using all of the sophisticated means and methods available to today's film makers, and without the constraint of having to conform the presentation to the requirements of an interface program, it is anticipated that presentations can be created which are sufficiently interesting that a user will want to watch them for their own sake. Once the user is enticed to watch the video presentation (which, through the present inventive method 34 has become an iteration of the interactive video interface 10), he or she can be shown the places, things, activities, or the like, to which the maker of the video presentation wishes to draw attention. As an example, a film maker might be given the task of creating a video for use as a sales presentation with the only restriction being that the items for sale are to be prominently displayed therein. The film maker can then bring all of his or her skill and ingenuity to bear to feature those items such that the consumer will be enticed to want to know more about those items. By applying the inventive interactive video creation method 34 to that video presentation, the resulting interactive video interface 10 will provide that consumer (the user of the interactive video interface 10) the opportunity to access such further information as is provided in the resource data base layer 12c.

As previously discussed, the interactive video creation method 4 of the present invention may be applied to essentially any video presentation, whether it be specifically created for the purpose or a preexisting presentation, such as an old movie or a television show, a training film made without the intention of using it as a computer interface, a travel film, or the like. Wherever it is desired to provide the user with the ability to selectively acquire more detailed information about the subjects of a live action video or film, the inventive interactive video creation method 34 should prove to be useful.

Since the interactive video creation method is not restricted to use with any particular computer platform, and since it provides a powerful new tool for the creators of application specific computer user interfaces, it is expected that it will be acceptable in the industry as an alternative to conventional interactive interface creation methods and means. For these and other reasons, it is expected that the utility and industrial applicability of the invention will be both significant in scope and long-lasting in duration.

I claim:

1. A method for creating an interactive computer/user video interface, comprising:

dividing a plurality of frames of a video presentation into sequences to create a primary video program layer;

identifying at least one key frame within each of said sequences and creating a key frame reference listing such that, in response to the user stopping the primary video program layer at any of the frames, a specific key frame, determined according to the key frame reference listing, will be displayed; and identifying at least one hot spot in each of said key frames such that the user will have access to a plurality of resource items in a resource data base program layer by the action of selecting one of the hot spots, and creating a hot spot reference listing such that in response to the user selecting one of the hot spots a specific one of a plurality of resource items will be presented to the user, that specific one resource item being selected according to the hot spot reference listing.

2. The method of claim 1, wherein:

at least some of the frames in the primary video program layer are designated as transitions between sequences.

3. The method of claim 1, wherein:

the key frame reference listing and the hot spot reference listing are included in a library program layer.

4. The method of claim 1, wherein:

the quantity of key frames within a sequence is determined, at least in part, according to the speed of motion of images within that sequence.

5. The method of claim 1, wherein:

the quantity of key frames within a sequence is determined, at least in part, according to the type of motion of images within that sequence.

6. In a computer having a video display, an interactive video computer/user interface, comprising:

a live action video presentation having a plurality of frames, the plurality of frames being divided into a plurality of sequences;

a resource database layer having therein a plurality of resource items, each of the resource items being an item of information available to the user; and a library program portion for causing the computer to display a specific one of a plurality of key frames of said video presentation when said video presentation is stopped by the user at any of the frames, and further for defining a plurality of hot spots within the key frames, the hot spots designating those portions of the key frames about which additional information is available, and further for linking each of said hot spots with a specific one of the resource items such that, when the user selects one specific hot spot, then the specific resource item designated as being associated with that hot spot is presented to the user on the video display.

7. The computer/user interface of claim 6, wherein:

the hot spots are framed, at least sometimes, on the key frames to identify the hot spots to the user.

8. The computer/user interface of claim 6, wherein:
the hot spots are framed on the key frames when the live action video presentation is stopped by the user.

9. The computer/user interface of claim 6, wherein:
each of the sequences includes at least one of the key frames.

10. The computer/user interface of claim 6, wherein:
each of the key frames includes at least one of the sequences.

* * * * *